(No Model.)
C. N. ASSELSTINE.
ANVIL FOR FORMING LANDSIDES FOR PLOWS.
No. 371,164. Patented Oct. 11, 1887.
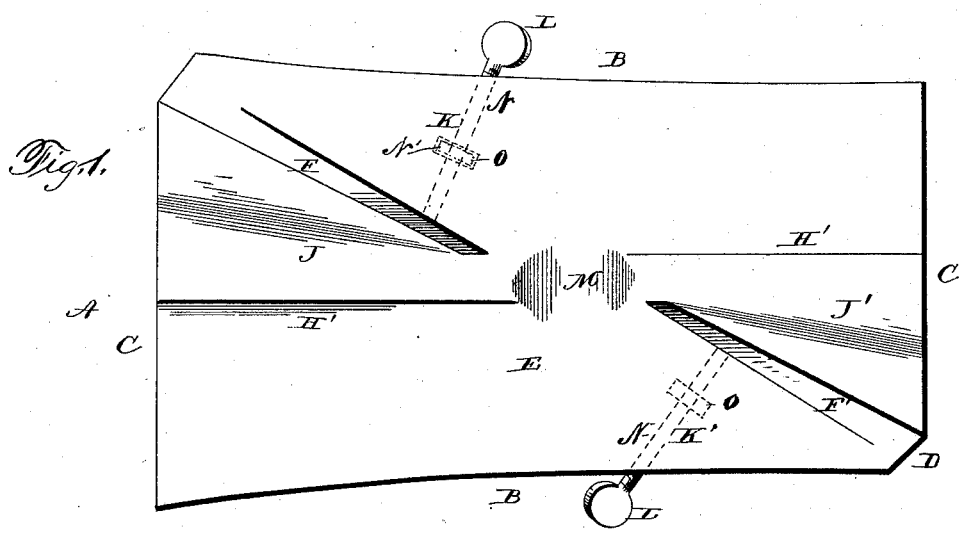
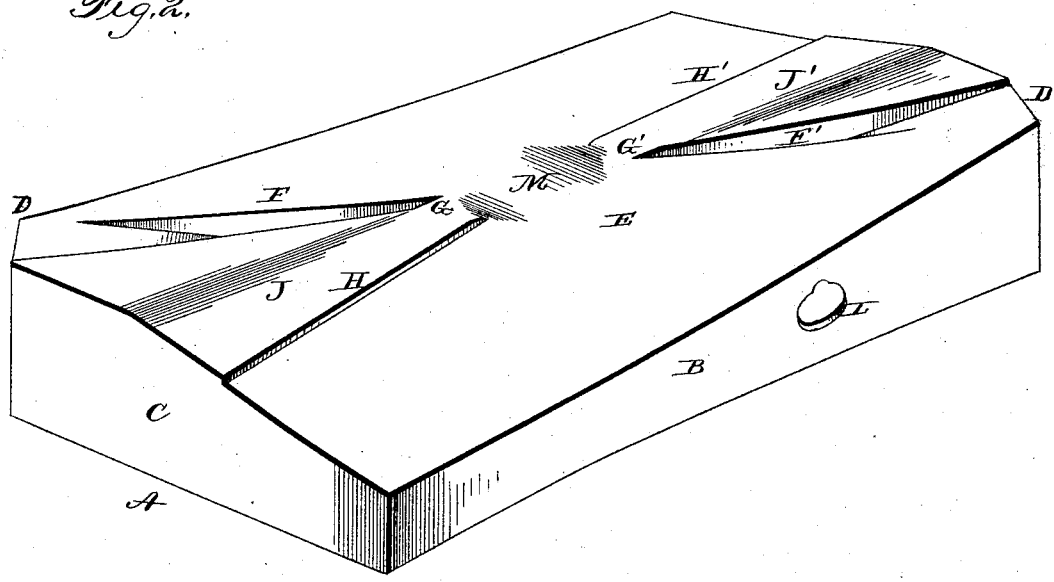

United States Patent Office.

CHARLES NICHOLAS ASSELSTINE, OF HAMILTON, DAKOTA TERRITORY.

ANVIL FOR FORMING LANDSIDES FOR PLOWS.

SPECIFICATION forming part of Letters Patent No. 371,164, dated October 11, 1887.

Application filed April 30, 1887. Serial No. 236,609. (No model.)

*To all whom it may concern:*

Be it known that I, CHARLES NICHOLAS ASSELSTINE, a citizen of the United States, residing at Hamilton, in the county of Pembina, Territory of Dakota, have invented certain new and useful Improvements in Anvils; and I do hereby declare the following to be a full, clear, and exact description of the invention, such as will enable others skilled in the art to which it appertains to make and use the same.

My invention relates to improvements in anvils which are designed for use in welding the flange of the landside and the landside together, either in making or repairing said parts; and it consists in an anvil constructed as hereinafter set forth and claimed.

In the accompanying drawings, Figure 1 represents a plan view of an anvil embodying my invention. Fig. 2 represents a perspective view thereof.

Similar letters refer to similar parts in different figures.

The letter A represents an anvil formed of metal, having its sides B curved and ends C straight, the opposite diagonal corners D being oblique, as shown in the drawings. The face E of the anvil is divided into halves, one of which is adapted to assist during the welding of the metallic parts of a breaking plow together, while the other half is employed when welding the like parts of a stubble-plow, the curvature of the halves corresponding to the configuration of the shares.

The letters F F′ represent grooves extending from the diagonal corners D to near the center of the face E, the said grooves increasing in depth from the said corners to their inner ends and increasing in width in the opposite direction, the end walls, G G′, of the said grooves being each respectively in the same plane as the straight-lined shoulders H H′ of the ridges J J′. The ridges J J′, which are between the shoulders H H′ and the grooves F F′, are rounded or convex, so as to conform to the shape of the upper face of a share when laid thereon.

The letters K K′ represent openings extending from the sides B to the grooves F F′, the said openings being at right angles to the said grooves. Working in said openings are thumb-screws L, so as to be readily turned and thereby firmly secure in place the part of the plow placed in the grooves F F′. In the base of the anvil are openings N, which permit the passage of nuts N′, adapted to be engaged by the screw-bolt L. Between the inner ends of said grooves F F′ is a concave depression, M, of the face, permitting the insertion of the end of the tongs which hold the landside in place while welding.

My anvil can be secured to a block or other suitable stand by any well known means.

In another application of even date herewith is shown and described an anvil having concave face portions and diagonal grooves on opposite sides of a center line, the same being designed to aid in the welding of the parts of a plow, but in a different stage of the operation from the one herein described.

In using the anvil herein described the flange of the landside is inserted in the groove F, and secured therein by the bolt L, the landside being held by tongs the end of which rests in the concave portion M of the face of the anvil. Owing to the conformation of the face of the anvil the portions of the landside and the flange that are to be welded together are easily kept in contact, so that no difficulty is experienced in welding the parts together.

What I desire to claim and secure by Letters Patent is—

1. An anvil for the purpose named provided with the two working-faces and having the grooves F and F′ increasing in depth from two diagonal opposite corners, said faces also provided with shoulders H H′, substantially as and for the purpose set forth.

2. An anvil having two working-faces, each provided with grooves increasing inwardly in depth from two diagonal opposite corners, but decreasing in width in the same direction, and having a depression intermediate of the inner ends of the two grooves, each of said faces being provided with shoulders, as and for the purpose specified.

3. An anvil having a groove with an opening leading thereto from the side, and provided with a screw-bolt working in said opening, and a second opening leading from the base or under side of the anvil permitting the passage of a nut which is adapted to be engaged by said screw-bolt, all substantially as and for the purpose specified.

In testimony whereof I affix my signature in presence of two witnesses.

CHARLES NICHOLAS ASSELSTINE.

Witnesses:
JOHN McMILLAN,
WINNIE McMILLAN.